United States Patent [19]
Leidig et al.

[11] Patent Number: 6,088,540
[45] Date of Patent: Jul. 11, 2000

[54] CAMERA FLASH UNIT INCLUDING A CONDENSER LENS ELEMENT WITH A TIR SURFACE

[75] Inventors: Carl F. Leidig; Scott B. Chase, both of Rochester, N.Y.

[73] Assignee: Eastman Kodak Company, Rochester, N.Y.

[21] Appl. No.: 08/932,087

[22] Filed: Sep. 17, 1997

[51] Int. Cl.⁷ .......................... G03B 15/03; G03B 17/02
[52] U.S. Cl. ............................ 396/155; 396/176; 396/6
[58] Field of Search .................................. 396/155, 176, 396/200; 315/241 P

[56] References Cited

U.S. PATENT DOCUMENTS

| | | | |
|---|---|---|---|
| 4,337,759 | 7/1982 | Popovich et al. | 126/438 |
| 5,021,811 | 6/1991 | Maurinus et al. | 396/6 |
| 5,055,976 | 10/1991 | Arai | 362/17 |
| 5,160,192 | 11/1992 | Sugawara | 362/16 |
| 5,280,315 | 1/1994 | Nomura et al. | 396/175 |
| 5,305,037 | 4/1994 | Noguchi et al. | 396/176 |
| 5,329,330 | 7/1994 | Sakai | 396/535 |
| 5,404,869 | 4/1995 | Parkyn et al. | 126/699 |
| 5,577,492 | 11/1996 | Parkyn, Jr. et al. | 126/698 |
| 5,813,743 | 9/1998 | Naka | 362/16 |
| 5,884,104 | 3/1999 | Chase et al. | 396/6 |

OTHER PUBLICATIONS

Abstract JP 08334811–A, Light illumination device for photographic camera.
Abstract JP TIR For Lenses Fluorescent Lamps, Spie Conference 2538, Jul. 11, 1995.
Optics, by Eugene Hecht/Alfred Zajac, Adelphi University, Feb. 1979, pp. 81–85.

*Primary Examiner*—Safet Metjahic
*Assistant Examiner*—Christopher E. Mahoney
*Attorney, Agent, or Firm*—Svetlana Z. Short

[57] ABSTRACT

A camera flash unit for illumination of an associated target surface comprises a linearly symmetric flash light source providing light defined as light rays, a reflector directing the light rays from the flash light source towards the associated target surface and a refractive/TIR (Totally Internally Reflective) condenser lens element. The reflector is located adjacent to one side of the flash light source. The refractive/TIR condenser lens element has optical power in two orthogonal directions and is located adjacent to another side of the flash light source. The refractive/TIR condenser lens element has two surfaces—a back surface facing the light source and a front surface. One of the two surfaces is a hybrid refractive/TIR surface, the other of the two surfaces is a refractive surface.

25 Claims, 13 Drawing Sheets

CAMERA FLASH UNIT INCLUDING A CONDENSER LENS ELEMENT WITH A TIR SURFACE

FIELD OF THE INVENTION

The present invention relates to compact camera flash units.

BACKGROUND OF THE INVENTION

A camera flash unit needs to provide good, relatively uniform illumination of a target surface located some distance (5–7 feet) away from a camera. Prior art camera flash units have a flash light source 6, a reflector 3, and a refractive lens element 8 (see FIG. 1A) to direct light rays generated by the flash light source 6 towards the target surface. In conventional camera flash units of the kind described above, the flash light source 6 is an elongated cylindrical flash lamp tube and the refractive lens element 8 is a condenser lens element with a cylindrical surface 9. That is, surface 9 provides optical power in one plane (for example, Y-Z plane) only. The condenser lens element 8 is used to direct the light from the flash lamp tube towards the intended subject. These camera flash units are relatively wide in a direction Z parallel to the optical axis of a taking lens. More specifically, a conventional condenser lens element 8 of a camera flash unit has to be spaced an appreciable distance d away from the flash light source 6 in order to adequately redirect the light rays emanating from the flash light source. This distance is equal to the back focus of the condenser lens element and is approximately 4 millimeters or larger. Because both the flash light source 6 and the condenser lens element 8 each have a thickness of greater than 1 millimeter, a conventional flash unit can not be made thinner than about 6 millimeters.

U.S. Pat. No. 5,160,192 discloses a flash unit (see FIG. 1B) that includes a reflector 3 composed of a combination of two reflective elliptical shells 4. The optical axes of the shells 4 are separated from one another. A flash light source 6 is located between the shells 4. The light source 6 has a longitudinal axis 7 parallel to the optical axes of the elliptical shells 4. A condenser lens element 8 is a Fresnel lens element and is located at the opening of the reflector 3. This condenser lens element 8 directs the light from the flash light source 6 and the reflective shells 4 towards a target surface. The flash light source 6 is spaced by a relatively large distance d away from the condenser lens element 8. Because of this distance, the width of the camera flash unit disclosed in U.S. Pat. No. 5,160,192 is large.

SUMMARY OF THE INVENTION

It is the principal object of the present invention to provide camera flash unit that is small in the direction of its optical axis and that provides a good illumination on a target surface located 5 to 7 feet away from a camera.

Briefly described, according to one aspect of the present invention, a camera flash unit for illumination of an associated target surface comprises a linearly symmetric flash light source providing light defined as light rays, a reflector directing the light rays from the flash light source towards the associated target surface and a refractive/TIR (Totally Internally Reflective) condenser lens element. The reflector is located adjacent to one side of the flash light source. The refractive/TIR condenser lens element has optical power in two orthogonal directions and is located adjacent to another side of the flash light source. The refractive/TIR condenser lens element has two surfaces—a back surface facing the light source and a front surface. One of the two surfaces is—a hybrid refractive/TIR surface, the other of the two surfaces is a refractive surface with optical power.

According to one embodiment of the present invention, the hybrid refractive/TIR surface has optical power in one direction and the other one of the two surfaces has optical power in an orthogonal direction.

According to one embodiment of the present invention, the flash light source is a cylindrical flash lamp tube, and the hybrid refractive/TIR surface has optical power in one direction and is the back surface facing the flash lamp tube.

According to one embodiment of the present invention (i) the flash light source is a cylindrical flash lamp tube, (ii) the reflector has a cylindrical channel with a concave surface oriented towards the flash light source and (iii) the refractive/TIR condenser lens element has a surface that is a Fresnel surface.

According to one embodiment of the present invention the Fresnel surface is the front surface of the refractive/TIR condenser lens element.

One advantage of the camera flash unit of the present invention is that it is more compact than the camera flash units of prior art.

BRIEF DESCRIPTION OF THE DRAWINGS

The foregoing and other objects, features and advantages as well as the presently preferred embodiment thereof will become more apparent from reading of the following description in connection with the accompanying drawings.

FIG. 5A depicts the Y-Z plane. FIG. 5B depicts the X-Z plane.

FIG. 6A depicts the Y-Z plane. FIG. 6B depicts the X-Z plane.

DESCRIPTION OF THE PREFERRED EMBODIMENT

Camera Flash Unit Structure

Figure 1A:
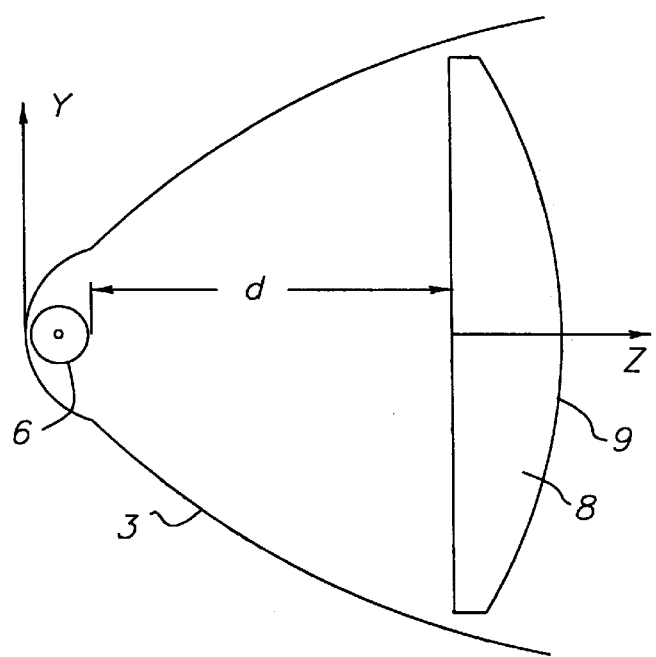
FIGS. 1A and 1B show prior art camera flash units.
Figure 1B:
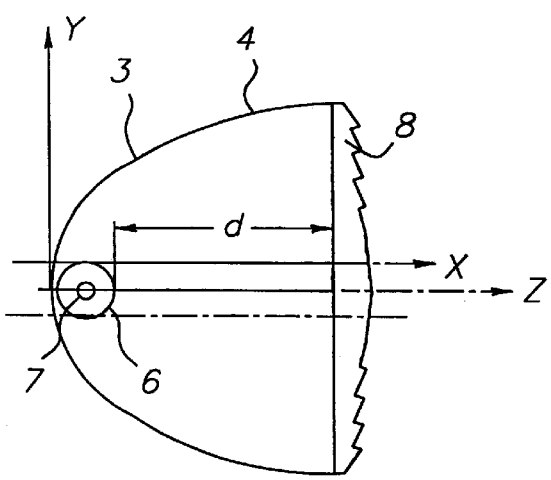
Figure 2:
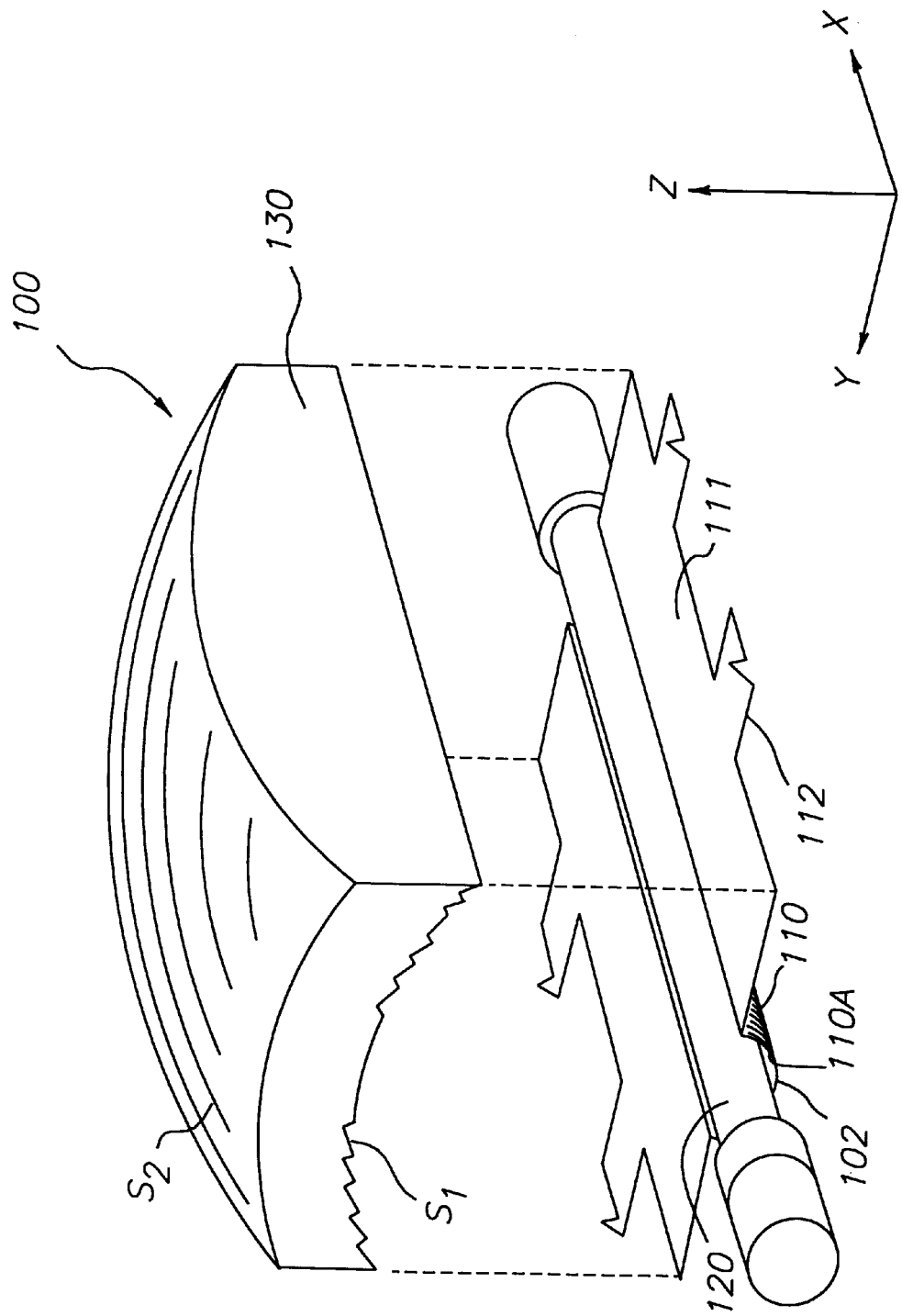
FIG. 2 is a top perspective view of the camera flash unit of a first embodiment of the present invention, with a condenser lens element being shown displaced from the other elements of the camera flash unit.
Figure 3:
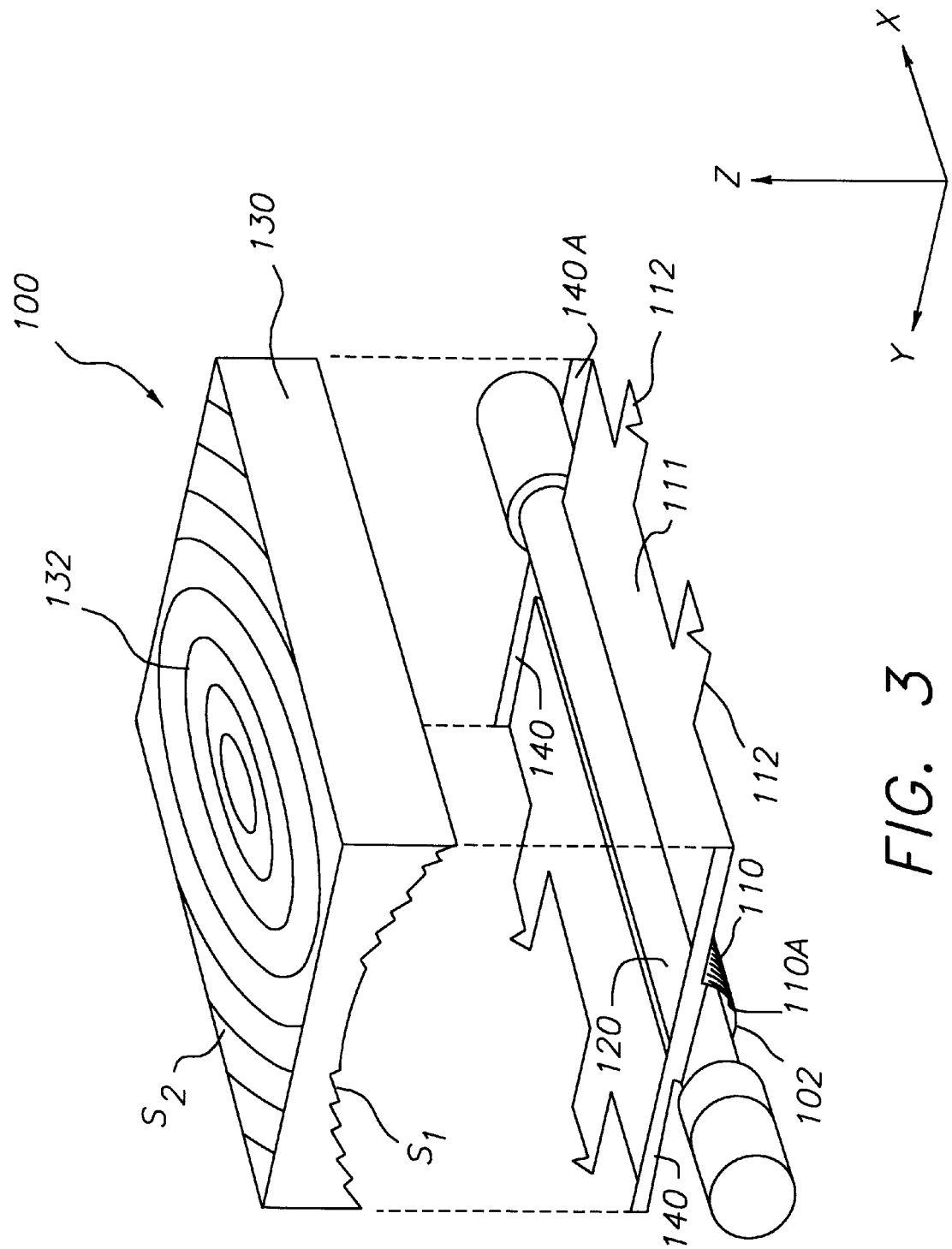
FIG. 3 is a top perspective view of the camera flash unit of another embodiment of the present invention, with a condenser lens element being shown displaced from the other elements of the camera flash unit.
Figure 4:
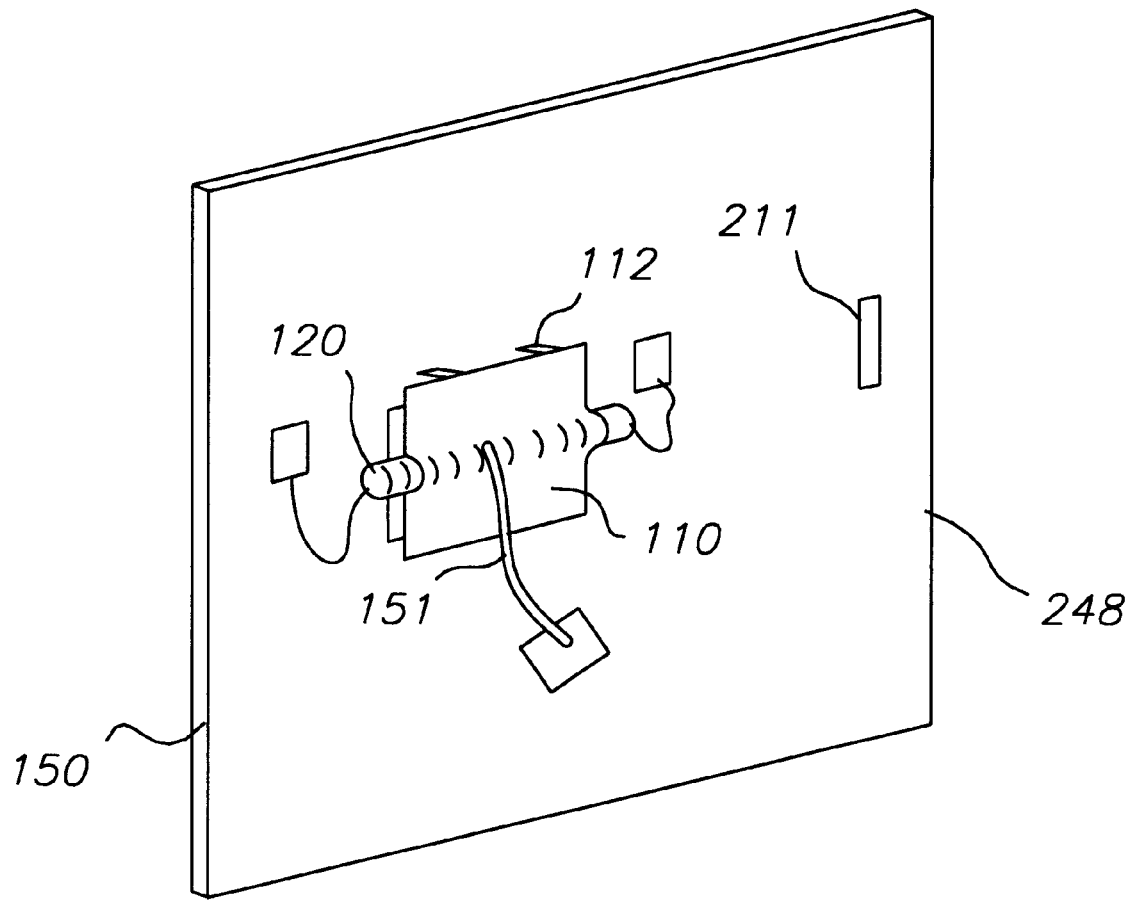
FIG. 4 is a rear perspective view of the camera flash unit of FIGS. 2 and 3 mounted in a circuit board.

FIGS. 2 and 3 are perspective views of a camera flash unit 100. This camera flash unit includes a trough reflector 102 with curving walls 110 with a highly reflective curving inner surface 110A and (optional) reflective wings 111. It also includes a linearly symmetrical (i.e., having one major line of symmetry, such as axis X, for example), elongated, cylindrical flash lamp tube 120 and a condenser lens element 130. In a preferred embodiment of the invention, the walls 110 are roughly cylindrical as shown in FIGS. 2 and 3. The reflective wings 111 are flat, but could also be curved. The camera flash unit 100 may also have optional side walls 140 (FIG. 3) that have reflective inner surface walls 140A which redirect intercepted light (coming directly from the flash lamp tube 120 as well as reflected by the highly reflective inner surface 110A towards a target surface. The walls 110 and 140 may have one or more tabs 112, for mounting the camera flash unit on a wall 150 (FIG. 4) such as a flash board or a circuit board 248, for example. In addition, it is preferred that the camera flash unit 100 comprise a trigger wire 151 that is in contact with the reflector 102 and that the reflector 102 be in contact with the flash lamp tube 120 (FIG. 4). The camera flash unit may also include other conventional features associated with known camera flash units.

Figure 5A:
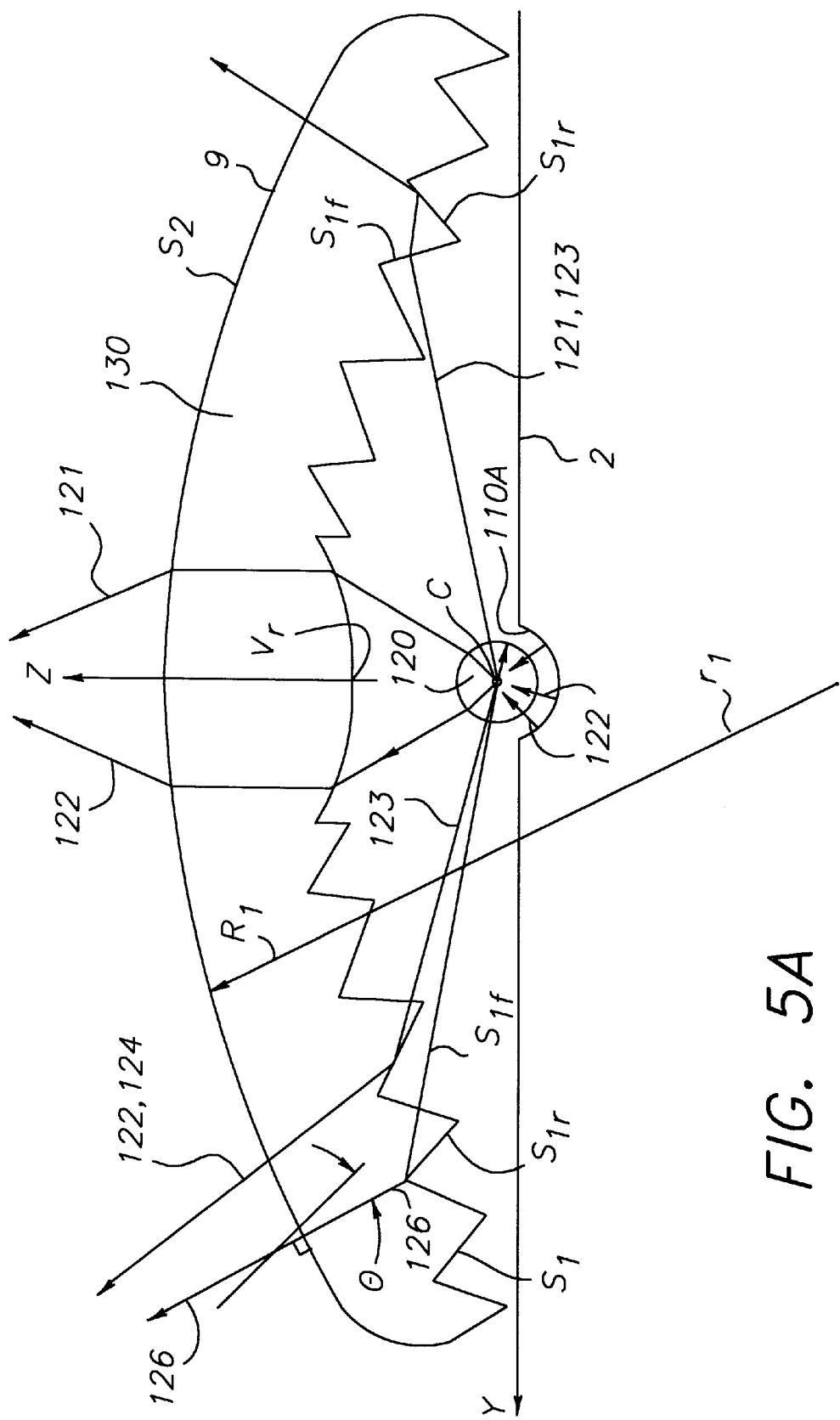
FIGS. 5A and 5B show a cross-sectional view of a camera flash unit of the first embodiment.

FIGS. 2, 4 and 5A–5B show a curving reflective inner surface wall 110A, the flash lamp tube 120 and the condenser lens element 130 of the camera flash unit 100 of the first embodiment. The condenser lens element 130 is a singlet. Its back surface (surface $S_1$) is a hybrid refractive/Total Internal Reflection (TIR) surface. The hybrid refractive/TIR surface is a surface that both refracts and totally internally reflects incident light rays. The phenomenon of the Total Internal Reflection is known and is described, for example, on pages 81–85 of the book "Optics" by Eugene Hecht and Alfred Zajak. The hybrid refractive/TIR surface $S_1$ provides optical power in only one direction (in Y-Z plane). This surface $S_1$ has a faceted surface profile that first refracts the incident light rays and then reflects the refracted light rays using total internal reflection, towards a front surface (surface $S_2$) as discussed below. This feature allows the back surface $S_1$ to be situated close to the flash lamp tube 120, so that the center distance d between the flash lamp tube 120 and the surface $S_2$ is smaller than 2 mm. It is preferred that this distance be smaller than 1 mm. More specifically, FIG. 5A illustrates the behavior of the light rays emanating from the camera flash unit 100 of the first embodiment. This figure shows in the Y-Z plane (side view) the light rays traveling from the flash lamp tube towards the reflective inner surface walls, reflecting off these walls and propagating through the condenser lens element 130. It shows that both the direct rays 121 and the reflected rays 122 are incident on the condenser lens element 130. These rays first encounter the back surface $S_1$ of the condenser lens element 130. As stated above, surface $S_1$ is a hybrid refractive/TIR surface. Substantially all of the light rays (rays 123) incident on this surface $S_1$ are first transmitted through the front surface $S_{1_f}$ of its facets, and then totally internally reflected as light rays 124 by the rear surface $S_{1_r}$ of its facets (FIG. 5A). The totally internally reflected light rays 124 are directed towards the front surface $S_2$ which directs the light rays 124 towards the target surface 25 (not shown).

Figure 5B:
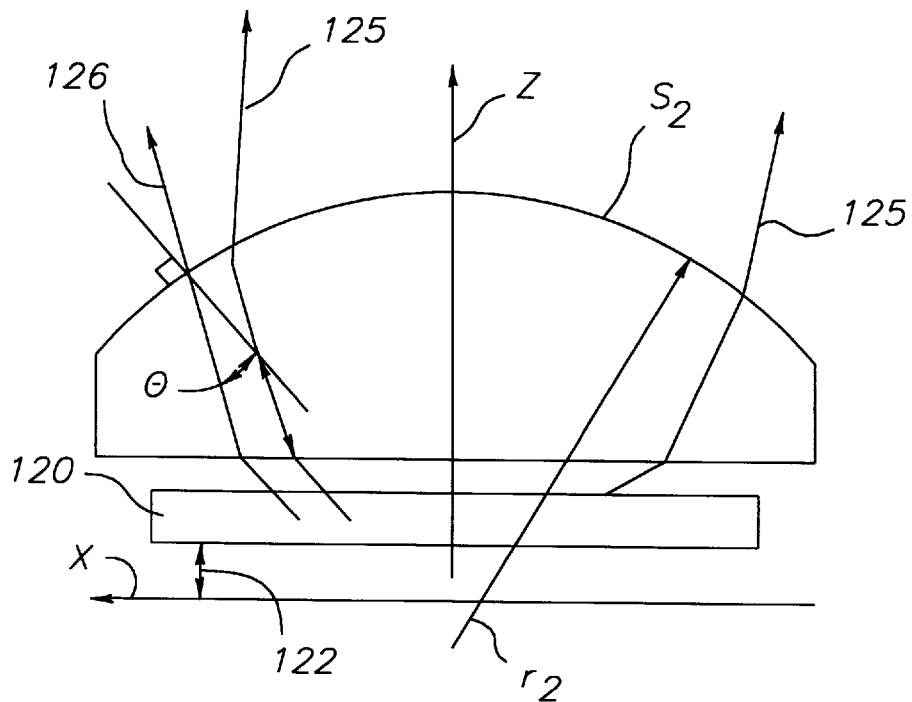

The front side surface (surface $S_2$) of a first embodiment (FIG. 3 and FIGS. 5A and 5B) of the condenser lens element 130 is not a rotationally symmetrical surface. It is a toroidal surface (i.e., it has different radii of curvature $r_1$, and $r_2$ in the X-Z and Y-Z planes, as shown in FIG. 5A, 5B), and thus, it provides different amounts of optical power in the X-Z and Y-Z planes. Because the front surface $S_2$ provides optical power in the X-Z plane, it refracts the non-perpendicular rays 125 emanating from the linear flash lamp tube 120 towards the intended target surface.

Figures 5C, 5D:
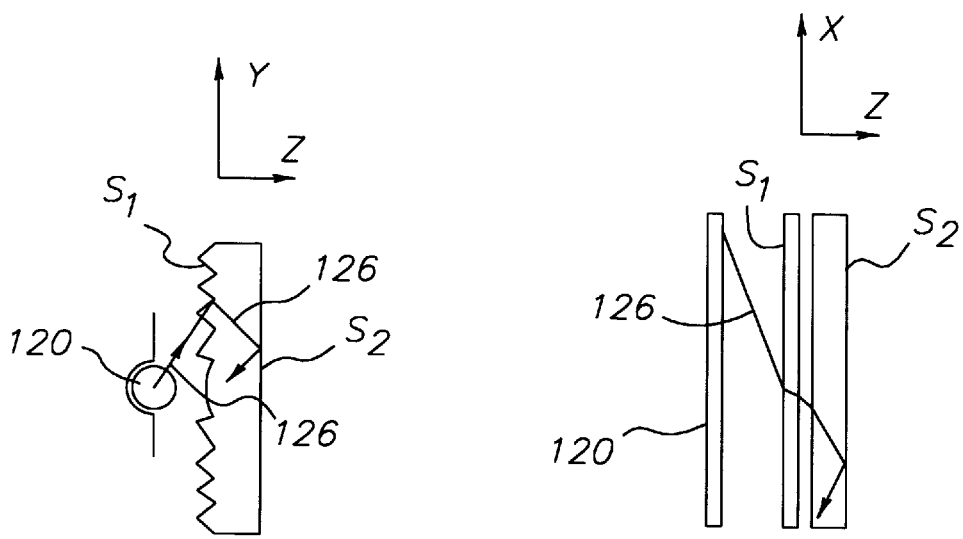
FIGS. 5C and 5D show a cross-sectional view of a camera flash unit with light rays trapped by a front surface of the condenser lens element.

A linear TIR lens element (a TIR lens element that provides optical power in only one direction, such as Y-Z plane) will suffer from sagittal ray internal reflection by the front surface $S_2$ (FIGS. 5C and 5D). That is, many of the rays emitted from a linearly symmetric source at a large out-of-plane angles with a condenser lens element's cross-section (Y-Z plane) will encounter the front surface $S_2$ at an incident angle that exceeds the critical angle for total internal reflection and will be totally internally reflected back towards the back surface $S_1$ (FIGS. 5C and 5D). Since not all of the light rays 126 would reach the target surface, the target surface 25 will not be properly illuminated. In addition, these rays 126 may become trapped within the refractive/TIR lens element heating this lens element and, possibly breaking or warping it.

We discovered that a condenser lens element 130 with a surface $S_2$ that has a radius of curvature in the X-Z plane directs the light rays 126 (emitted from the flash lamp tube at large out of plane (Y-Z plane)) angles towards the target surface 25. Thus, these rays 126 will not be trapped by the front lens surface $S_2$ (FIG. 5A). Furthermore, because the front surface $S_2$ of the condenser lens element 130 is toroidal (i.e., it has different optical power in X-Z and Y-Z planes), the surface $S_2$ of the condenser lens element 130 can independently control the illumination in at least two directions transverse to the optical axis Z of the condenser lens element. This results in a good light distribution at the target surface 25 located 5–8 feet away from flash unit 100. However, it is contemplated that the front surface $S_2$ does not have to be toroidal as long as it provides optical power in the X-Z plane.

The specific parameters for the refractive/TIR condenser lens element of the first embodiment 130 are provided in Tables 1A and 1B.

TABLE 1A

| Surface | Y Radius | X Radius | Thickness | Index |
|---------|----------|----------|-----------|-------|
| $S_1$ | TIR surface | | 4 mm | 1.58 |
| $S_2$ | −50 mm | −10 mm | | |

*The specific parameters for the TIR surface are provided in Table 1B where the TIR surface is defined by 37 different points. The coordinates (Y and Z) of these points are provided below in Table 1B.

TABLE 1B

TIR Surface/Surface $S_1$
(Dimensions in cm)

| Point location | (Z) | (Y) |
|----------------|-------|------|
| 1 | 0 | 0 |
| 2 | 0.005 | 0.02 |
| 3 | 0.01 | 0.04 |
| 4 | 0.015 | 0.06 |
| 5 | 0.02 | 0.08 |
| 6 | 0.03 | 0.1 |

TABLE 1B-continued

TIR Surface/Surface $S_1$
(Dimensions in cm)

| Point location | (Z) | (Y) |
|---|---|---|
| 7 | 0.04 | 0.12 |
| 8 | 0.05 | 0.14 |
| 9 | 0.065 | 0.16 |
| 10 | 0.08 | 0.18 |
| 11 | 0.1 | 0.2 |
| 12 | 0.11 | 0.22 |
| 13 | 0.12 | 0.24 |
| 14 | 0.12 | 0.26 |
| 15 | 0.124 | 0.295 |
| 16 | 0.093 | 0.3 |
| 17 | 0.165 | 0.369 |
| 18 | 0.080 | 0.37 |
| 19 | 0.164 | 0.442 |
| 20 | 0.069 | 0.442 |
| 21 | 0.15 | 0.512 |
| 22 | 0.051 | 0.513 |
| 23 | 0.12 | 0.588 |
| 24 | 0.030 | 0.59 |
| 25 | 0.089 | 0.671 |
| 26 | 0.009 | 0.672 |
| 27 | 0.071 | 0.748 |
| 28 | −0.016 | 0.75 |
| 29 | 0.045 | 0.834 |
| 30 | −0.045 | 0.835 |
| 31 | 0.018 | 0.920 |
| 32 | −0.077 | 0.921 |
| 33 | −0.014 | 1.012 |
| 34 | −0.114 | 1.012 |
| 35 | −0.047 | 1.096 |
| 36 | −0.156 | 1.1 |
| 37 | −0.082 | 1.166 |

It is contemplated that the front surface $S_2$ may be either spherical or cylindrical or toroidal and may also be aspherical and defined by a standard aspheric equation (see equations 1 and 2) and by a conic constant and/or higher order aspheric coefficients. This would further facilitate illumination control of the target surface 25 by fine tuning the direction of the light rays exiting surface $S_2$ of the condenser lens element 130.

$$Z(Y) = \frac{C_1 Y^2}{1 + \sqrt{1 - (K+1)C_1^2 Y^2}} + ADY^4 + AEY^6 + AFY^8 + AGY^{10} + AHY^{12} + AIY^{14} + AJY^{16} + AKY^{18}; \quad \text{(eq.1)}$$

$$Z(X) = \frac{C_2 X^2}{1 + \sqrt{1 - (K+1)C_2^2 X^2}} + ADX^4 + AEX^6 + AFX^8 + AGX^{10} + AHX^{12} + AIX^{14} + AJX^{16} + AKX^{18} \quad \text{(eq.2)}$$

where:
  Z is the distance along the optical axis of the condenser lens element;
  Y is the height from the optical axis along the Y axis;
  X is the height from the optical axis along the X axis;
  $C_1$, $C_2$ are the reciprocals of the vertex radii ($r_1$, $r_2$) of curvature of the condenser lens element; surface;
  K is the conic coefficient; and
  AD through AK are aspheric coefficients of 4th, 6th, 8th, 10th, 12th, 14th, 16th, and 18th order.

Figure 6A:
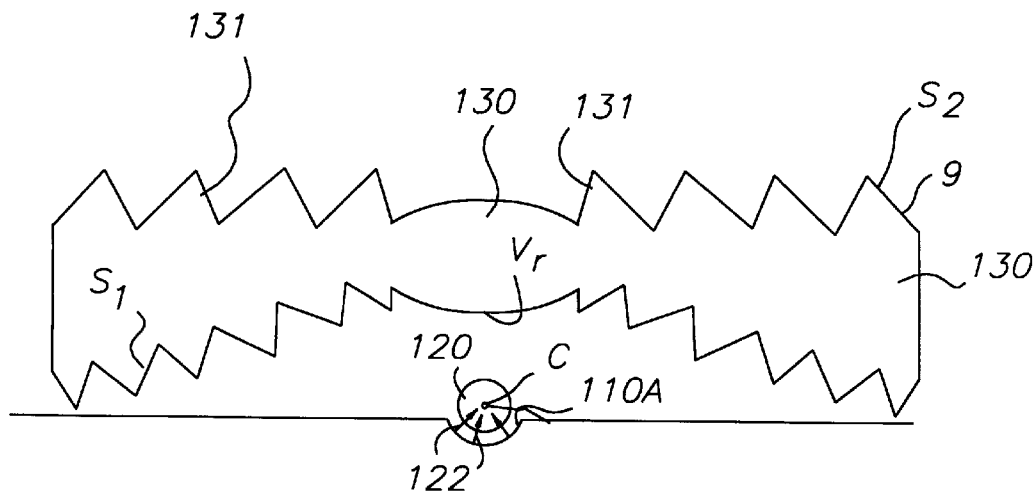
FIGS. 6A and 6B show a cross-sectional view of a camera flash unit of the second embodiment.
Figure 6B:
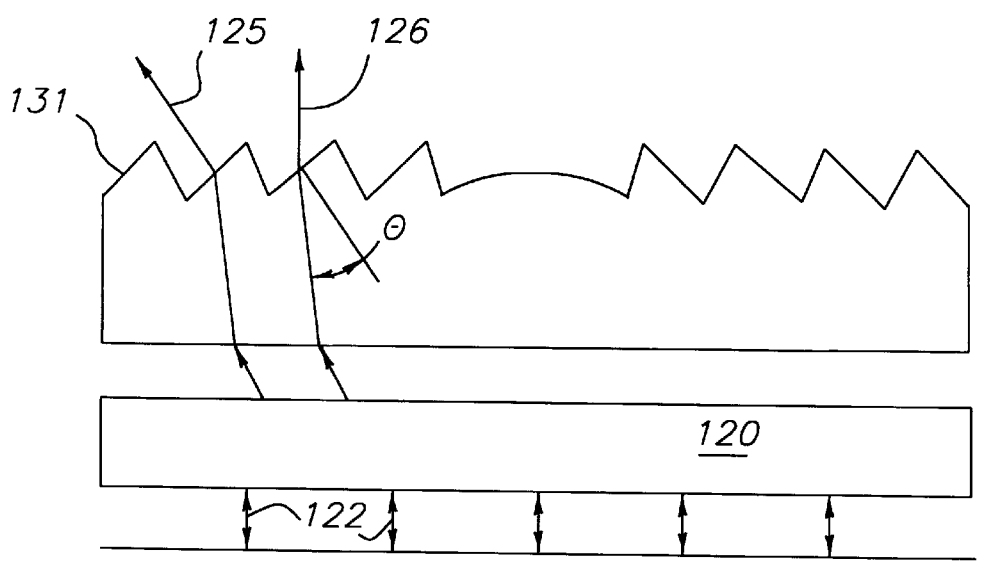

FIGS. 3, 6A and 6B illustrate a second embodiment of the present invention which provides an even more compact flash unit than that of the first embodiment. In the second embodiment, the refractive/TIR condenser lens element 130 has a front side surface $S_2$ with Fresnel lens facets 131 providing optical power in at least the cross-section that is orthogonal to the surface cross-section of surface $S_1$ providing optical power to the surface $S_1$ (FIG. 6B). In general, the Fresnel lens facets of the front surface may be located in any number of orientations on the front side surface $S_2$ of the refractive/TIR condenser lens element. Preferably, the Fresnel facets 131 form ridges 132 (FIGS. 6A, 6B) having an elliptical shape. However, for manufacturing ease, the Fresnel facets 131 would form ridges 132 having circular symmetric shapes. The Fresnel facets 131 help to reduce the average angles-of-incidence θ of the out-of-plane light rays 126 as they encounter the front surface $S_2$, thereby reducing reflection losses to bring about a greater concentration of radiant energy in the target surface 25.

The second embodiment of the present invention maintains linear symmetry on the back surface $S_1$ (i.e. flash lamp tube side surface) of the refractive/TIR condenser lens element and circular (i.e. radial) symmetry on the front surface $S_2$ of the refractive/TIR condenser lens element. Mold halves for the complete refractive/TIR condenser lens elements could be readily fabricated and then used to produce plastic condenser lens elements by a number of means including compression or injection molding.

The specific parameters for the refractive/TIR condenser lens element 130 of the second embodiment are provided in Tables 2A and 2B. It is noted that the back surface $S_1$ of the condenser lens element 130 of the second embodiment is the same to that of surface $S_1$ of the first embodiment and that the surface $S_2$ (described in the Table 2B) is different.

TABLE 2A

TIR SURFACE OF LENS ELEMENT 130
(Dimensions in cm)

| POINT | Sag at Radial Coordinate (Z) | Coordinate (Y) |
|---|---|---|
| 1 | 0 | 0 |
| 2 | 0.005 | 0.02 |
| 3 | 0.01 | 0.04 |
| 4 | 0.015 | 0.06 |
| 5 | 0.02 | 0.08 |
| 6 | 0.03 | 0.1 |
| 7 | 0.04 | 0.12 |
| 8 | 0.05 | 0.14 |
| 9 | 0.065 | 0.16 |
| 10 | 0.08 | 0.18 |
| 11 | 0.1 | 0.2 |
| 12 | 0.11 | 0.22 |
| 13 | 0.12 | 0.24 |
| 14 | 0.12 | 0.26 |
| 15 | 0.124 | 0.295 |
| 16 | 0.093 | 0.3 |
| 17 | 0.165 | 0.369 |
| 18 | 0.080 | 0.37 |
| 19 | 0.164 | 0.442 |
| 20 | 0.069 | 0.442 |
| 21 | 0.15 | 0.512 |
| 22 | 0.051 | 0.513 |
| 23 | 0.12 | 0.588 |
| 24 | 0.030 | 0.59 |
| 25 | 0.089 | 0.671 |
| 26 | 0.009 | 0.672 |
| 27 | 0.071 | 0.748 |
| 28 | −0.016 | 0.75 |
| 29 | 0.045 | 0.834 |
| 30 | −0.045 | 0.835 |
| 31 | 0.018 | 0.920 |
| 32 | −0.077 | 0.921 |
| 33 | −0.014 | 1.012 |
| 34 | −0.114 | 1.012 |
| 35 | −0.047 | 1.096 |

TABLE 2A-continued

TIR SURFACE OF LENS ELEMENT 130
(Dimensions in cm)

| POINT | Sag at Radial Coordinate (Z) | Coordinate (Y) |
|---|---|---|
| 36 | −0.156 | 1.1 |
| 37 | −0.082 | 1.166 |

TABLE 2B

FRESNEL SURFACE OF LENS ELEMENT 130
(Dimensions in cm)
Radial Profile Coordinates
Second Surface of Lens Element

| | Sag at Radial Coordinate Z | Radial Coordinate Y |
|---|---|---|
| 1 | 0 | 0 |
| 2 | −0.1 | 0.3 |
| 3 | 0 | 0.3 |
| 4 | −0.1 | 0.5 |
| 5 | 0 | 0.5 |
| 6 | −0.1 | 0.65 |
| 7 | 0 | 0.65 |
| 8 | −0.1 | 0.75 |
| 9 | 0 | 0.75 |
| 10 | −0.1 | 0.825 |
| 11 | 0 | 0.825 |
| 12 | −0.1 | 0.9 |
| 13 | −0.1 | 1.15 |

Thickness = 2 mm

The back surface $S_1$ of the refractive/TIR condenser lens element 130 begins 0.8 mm in front of the flash lamp's surface. The refractive/TIR condenser lens element 130 has a refractive index of 1.58. The refractive/TIR condenser lens element 130 is approximately 18 mm wide by 23 mm high.

Behind and adjacent to the flash lamp tube 120 is the trough reflector 102. This reflector is essentially concentric with the flash lamp tube's back wall (i.e., the reflector facing wall). The reflectivity of the surface 110A reflectivity is at least 80%. As can be seen from FIGS. 2 and 3, the reflector's shape closely tracks the shape of the flash lamp tube 120.

This arrangement allows the reflected light rays 122 to be directed toward the center C (FIGS. 5A and 5B) of the flash lamp tube and mitigates shadowing effects caused by the flash lamp tube. The flash lamp tube 120 nearly touches the condenser lens element 130. The center C of the flash lamp tube 120 is located about 1 millimeter away from the rear vertex $V_r$ of the condenser lens element 130. The actual distance is determined by the diameter of the flash lamp tube and by the base curvature of the back surface $S_1$ of the condenser lens element 130.

As stated above, at either end of the trough (of the flash lamp tube 120) (FIGS. 2 and 3) are reflective wings 111. They also have a reflectivity of at least 80%.

The additional specific parameters for the flash lamp tube described above are as follows:

According to a preferred embodiment, the flash lamp tube 120 delivers approximately 5.5 joules of radiant energy per flash. This radiant energy is visible, near UV (ultra violet) and near IR (infra-red) light. The example illustrated in FIGS. 2, and 3, utilizes a xenon flash lamp tube.

This flash lamp tube is modeled as a Lambertian cylindrical source with the length of 12.5 mm, an inside diameter of 0.7 mm and an outside diameter of 1.5 mm. The plasma or source illumination fills the inside diameter of the flash lamp tube. The refractive index of the cylindrical walls of the modeled flash lamp tube is 1.46.

Camera Flash Unit Performance

Figure 7:
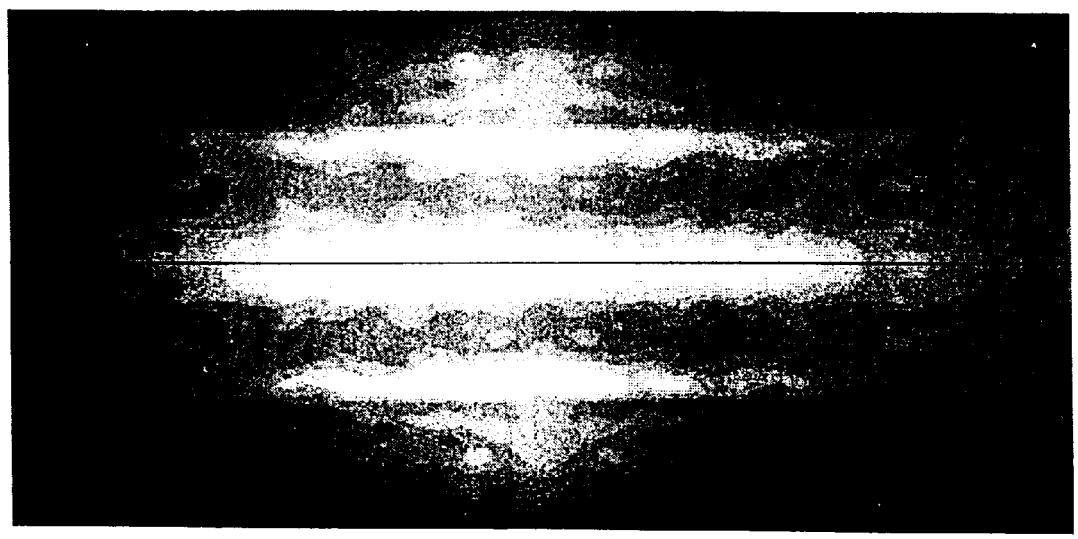
FIGS. 7 and 8 are plots of the intensity distribution at the target surface. The target surface is parallel to the X-Y plane (where X is the horizontal direction and Y is the vertical direction) of the flash unit and is at a separation of 7.5 feet from the flash unit.
Figure 8:
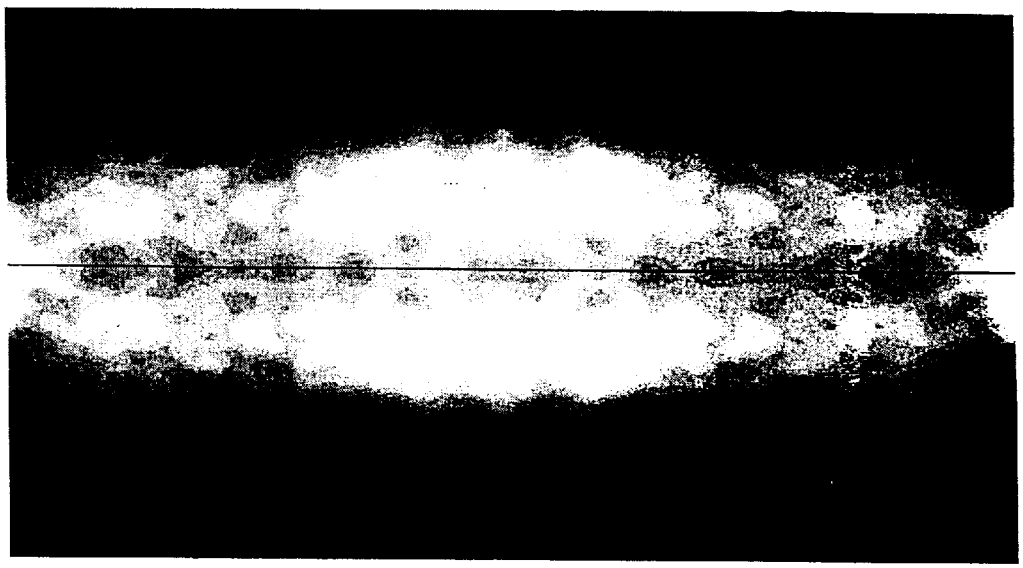

As discussed above, the introduction of power in the orthogonal direction (to that provided by the surface $S_1$) by the front surface $S_2$ of the condenser lens element, as exemplified by the first and second embodiments, redirects the light rays 125 which are not perpendicular to the axis of symmetry X of the linear flash lamp tube towards the intended target surface (FIGS. 5B, 6B). This gives the advantage of greater concentration of radiant energy on the target surface 25. The camera flash unit of the preferred embodiments described herein achieves a good illumination on the target surface 25 of approximately 275 cm ×160cm (width and height) located about 230cm away from the refractive/TIR condenser element 130. Tables 3 and 4 provide relative illumination intensities on the target 25 for the first and second embodiments, respectively and correspond to FIGS. 7 and 8. FIG. 7 corresponds to Table 3 and is a plot of the intensity distribution in the Y-X plane for the camera flash unit utilizing the refractive/TIR condenser lens element with the Fresnel front surface $S_2$. FIG. 8 corresponds to Table 4 and is a plot of the intensity distribution in the Y-X plane for the flash unit 100 utilizing a refractive/TIR condenser lens element with the toroidal front surface. The intensity distributions are normalized, with the intensity having a value of 100 at the center of the target surface 25.

TABLE 3

| 41 | 47 | 48 | 49 | 51 | 51 | 43 | 51 | 51 | 49 | 48 | 46 | 41 |
|---|---|---|---|---|---|---|---|---|---|---|---|---|
| 37 | 47 | 43 | 42 | 45 | 42 | 45 | 44 | 46 | 41 | 42 | 49 | 38 |
| 44 | 46 | 53 | 53 | 59 | 64 | 64 | 64 | 61 | 54 | 53 | 45 | 43 |
| 62 | 77 | 71 | 76 | 85 | 99 | 96 | 98 | 85 | 76 | 70 | 77 | 65 |
| 77 | 95 | 96 | 100 | 106 | 116 | 112 | 115 | 107 | 101 | 96 | 94 | 78 |
| 92 | 90 | 93 | 96 | 96 | 95 | 100 | 97 | 96 | 97 | 95 | 90 | 91 |
| 93 | 88 | 92 | 97 | 96 | 95 | 100 | 97 | 96 | 97 | 93 | 88 | 92 |
| 77 | 95 | 96 | 100 | 106 | 115 | 113 | 114 | 107 | 100 | 96 | 94 | 79 |
| 64 | 78 | 72 | 78 | 88 | 101 | 97 | 100 | 87 | 77 | 71 | 77 | 66 |
| 43 | 46 | 53 | 56 | 58 | 64 | 65 | 64 | 60 | 56 | 53 | 46 | 43 |
| 38 | 47 | 45 | 42 | 47 | 44 | 46 | 45 | 48 | 42 | 44 | 48 | 38 |
| 40 | 46 | 47 | 50 | 50 | 49 | 42 | 49 | 49 | 50 | 47 | 45 | 41 |

TABLE 4

| | | | | | | | | | | | | |
|---|---|---|---|---|---|---|---|---|---|---|---|---|
| 45.1 | 52.1 | 53.2 | 54.6 | 57.0 | 56.1 | 47.2 | 56.4 | 56.2 | 54.8 | 53.6 | 50.6 | 46.0 |
| 41.3 | 52.2 | 47.8 | 46.4 | 50.2 | 47.0 | 50.3 | 48.3 | 51.0 | 45.9 | 47.0 | 54.0 | 42.1 |
| 48.3 | 50.7 | 58.6 | 59.2 | 65.7 | 71.4 | 70.7 | 71.0 | 68.0 | 59.8 | 58.4 | 50.3 | 48.2 |
| 68.9 | 85.9 | 78.8 | 84.4 | 94.5 | 109.5 | 106.6 | 108.4 | 94.3 | 84.1 | 77.8 | 85.1 | 71.8 |
| 85.1 | 105.3 | 106.9 | 111.3 | 117.8 | 128.4 | 123.9 | 127.8 | 118.9 | 111.9 | 106.3 | 104.6 | 86.4 |
| 102.6 | 100.2 | 103.5 | 107.1 | 106.8 | 105.1 | 111.0 | 107.4 | 106.7 | 107.6 | 105.1 | 99.9 | 100.6 |
| 103.7 | 98.2 | 102.1 | 107.6 | 106.5 | 105.6 | 111.1 | 107.8 | 106.4 | 107.9 | 103.7 | 97.9 | 102.1 |
| 85.9 | 105.3 | 107.1 | 111.1 | 117.6 | 127.8 | 125.5 | 127.0 | 118.9 | 111.5 | 106.4 | 104.5 | 87.4 |
| 70.8 | 86.7 | 79.6 | 86.2 | 97.3 | 111.9 | 108.0 | 110.5 | 97.0 | 85.6 | 78.9 | 85.6 | 73.3 |
| 47.7 | 51.1 | 59.1 | 61.8 | 64.7 | 71.0 | 71.9 | 71.1 | 67.0 | 62.4 | 59.2 | 50.7 | 47.5 |
| 42.0 | 52.0 | 49.4 | 46.8 | 52.1 | 49.1 | 51.0 | 50.5 | 52.9 | 46.4 | 48.7 | 53.7 | 42.6 |
| 44.8 | 51.5 | 52.1 | 55.3 | 55.2 | 54.7 | 46.6 | 54.9 | 54.4 | 55.0 | 52.3 | 50.3 | 45.5 |

The previously described camera flash unit 100 having the above-described condenser lens element 130 is operationally connected to a capacitor 246, is mounted on the circuit board 248 and is powered by a battery 250. The circuit board includes circuit elements necessary to develop a charge and to activate the flash lamp tube. The circuit board can include flash synchronization contacts for releasing the energy required by the flash lamp tube.

Camera Assembly

Figure 9:
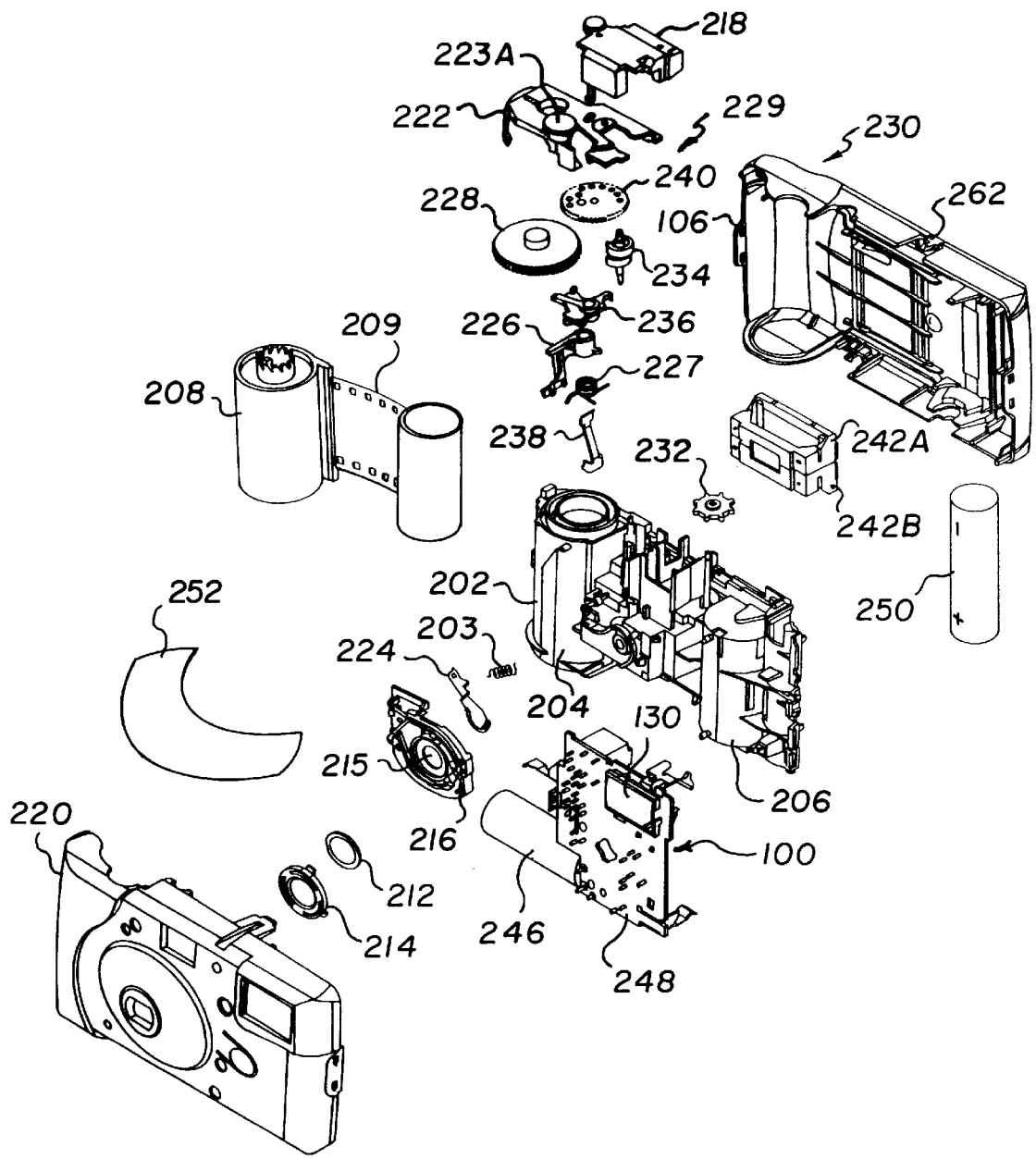
FIG. 9 illustrates an exploded view of a camera incorporating a camera flash unit of FIGS. 2 or 3.

Referring now to FIG. 9, the camera flash unit 100 can be obtained within the assemblage of a camera, such as a recyclable single use camera 200 having a body assembly with three major structural components; a body or frame 202, a front cover 220 which is attached to the front of the body 202, and a rear cover 230 which is attached to the rear of the body 202.

Referring more specifically to the exploded view of the camera 200 shown in FIG. 9, the body 202 includes a pair of film chambers 204, 206 (i.e., a cartridge chamber 204 and a film chamber 206) for retaining a film cassette 208 and a roll of unexposed film, respectively. An exposure gate 207 is disposed between the film chambers 204, 206. The body 202 (see FIG. 9) additionally supports the following camera parts which are attached to the body prior to the attachment of the covers 220, 230: a taking lens 212 which is attached to the front of the body 202 by means of a two piece holder 214, 216 and a viewfinder 218. Also, attached to the body 202 is a shutter mechanism 219 consisting of a release 222 having a depressible button 223A for tripping a shutter blade 224. The shutter blade 224 is held in place over an aperture 215 by a holder 216. The shutter blade 224 is movable between an open position and a closed position and is biased toward the closed position by a helical spring 223. A high energy lever 226 is mounted in the body between the release 222 and the shutter blade 224. The high energy movable lever 226 is movable from a release position to a set position by a film advancing and metering mechanism 229. The high energy lever 226 is biased toward the released position by a spring 227. The high energy lever 226 is held in the set position by a film advancing and metering mechanism 229 until a shutter release button 223A is pressed, at which time the high energy lever 226 is driven by the spring 227 against the shutter blade moving the shutter blade from the closed position to the open position. The high energy lever 226 then moves past the shutter blade and the shutter blade returns to the closed position under the action of the spring 223. The high energy lever is reset for the next film exposure by the film advancing and metering mechanism.

The film advancing and metering mechanism 229 includes mechanically coupled components which advance and meter the film. A thumbwheel 228 engages the spool (not shown) of the loaded film cassette 208. A sprocket 232 engages film perforations and has a spring biased portion extending into a rotatable cam 234 which engages a metering lever 236, biased by means of a spring 238, so as to enable frame by frame film advance. The cam 234 has an extending portion that drives a frame counter 240.

Figure 10B:
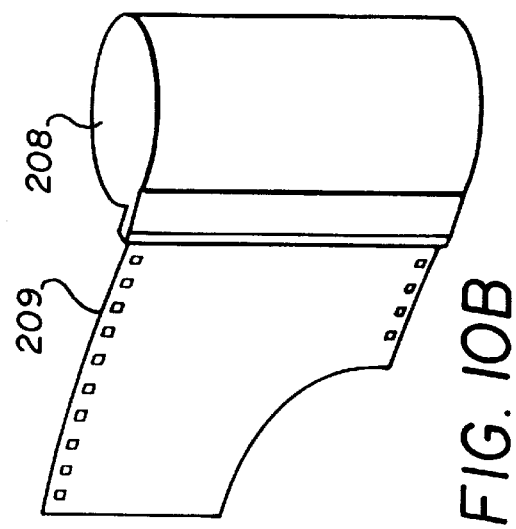
FIG. 10B is a perspective view of a film cassette suitable for use in the camera of FIG. 10A.
Figure 10A:
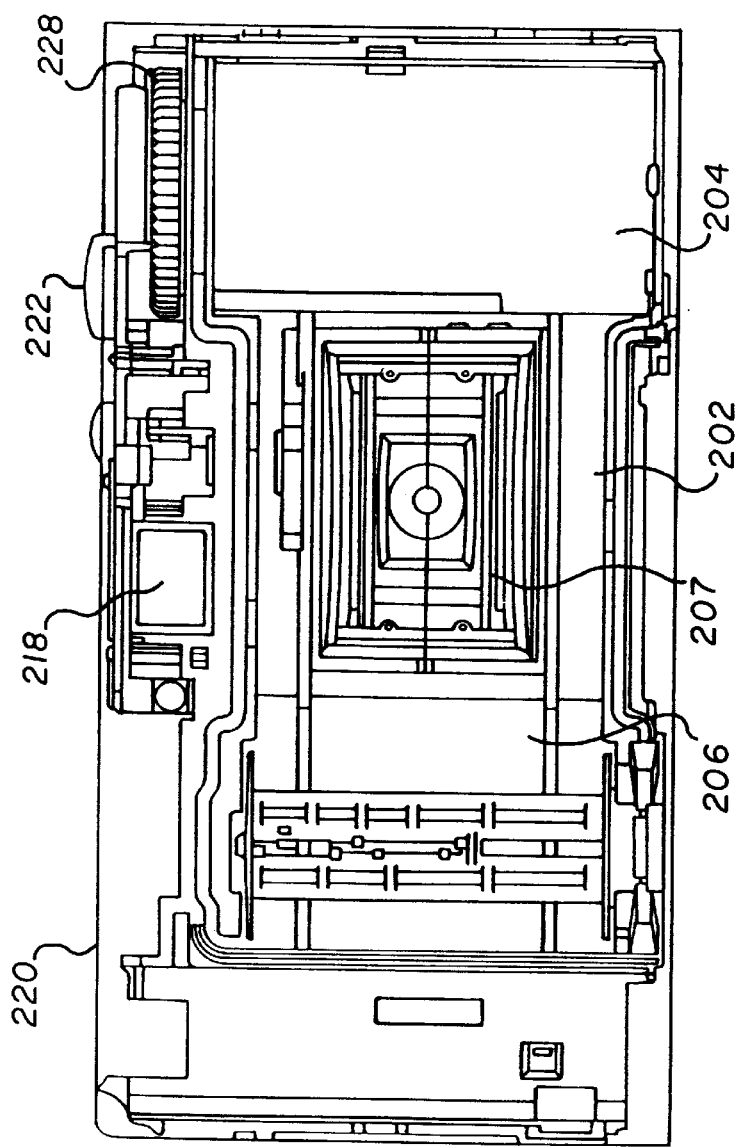
FIG. 10A is a rear plane view of the camera of FIG. 9 with the rear cover removed.

The body assembly 201 also includes a light baffle 242, (made of an upper baffle part 242A and lower baffle part 242B) which are mounted into the rear of the body 202 interior to exposure gate 207 (FIG. 10), or alternatively are integrally formed with the body 202.

The front cover 220 and the rear cover 230 are sandwiched and held together along with the body 202 by hooks and matching slots, or tabs, or heat, or solvent welding, or the like, to form an assembled camera. One or more decorative labels 252 may be subsequently attached to the finished camera to provide a convenient place for product identification and operational information. The label or labels may take the form of a sticker or a folded cardboard element.

For a variety of reasons, including economic efficiency and environmental concerns, single use cameras, such as the described camera 200, are designed to be recycled by the manufacturer after a purchaser has completed exposing the loaded film and turned the camera over to a photofinisher for development of the film. See, for instance, U.S. Pat. No. 5,329,330 to Sakai, et al. Therefore, certain parts of the cameras are designed to last through a suitable number of cycles of sale, use, reconstruction, and resale. Conversely, for quality reasons, among others, certain parts should be replaced each time a camera is reconstructed. To successfully recycle cameras, it is important to know when particular reused camera parts should no longer be utilized because, for example, they have reached the end of their useful life. Thus, each time a camera is recycled, as described in detail below, a mark on the camera body and/or flash mechanism may be made in accordance with commonly owned U.S. Pat. No. 5,021,811 (the disclosure of which is incorporated by reference herein) to indicate the number of times it has been reconstructed. A mark or reuse indicator 211 may be placed on a circuit board 248 as shown in FIG. 4 to be used in indicating the number of times the board 268 has been recycled.

Figure 11:
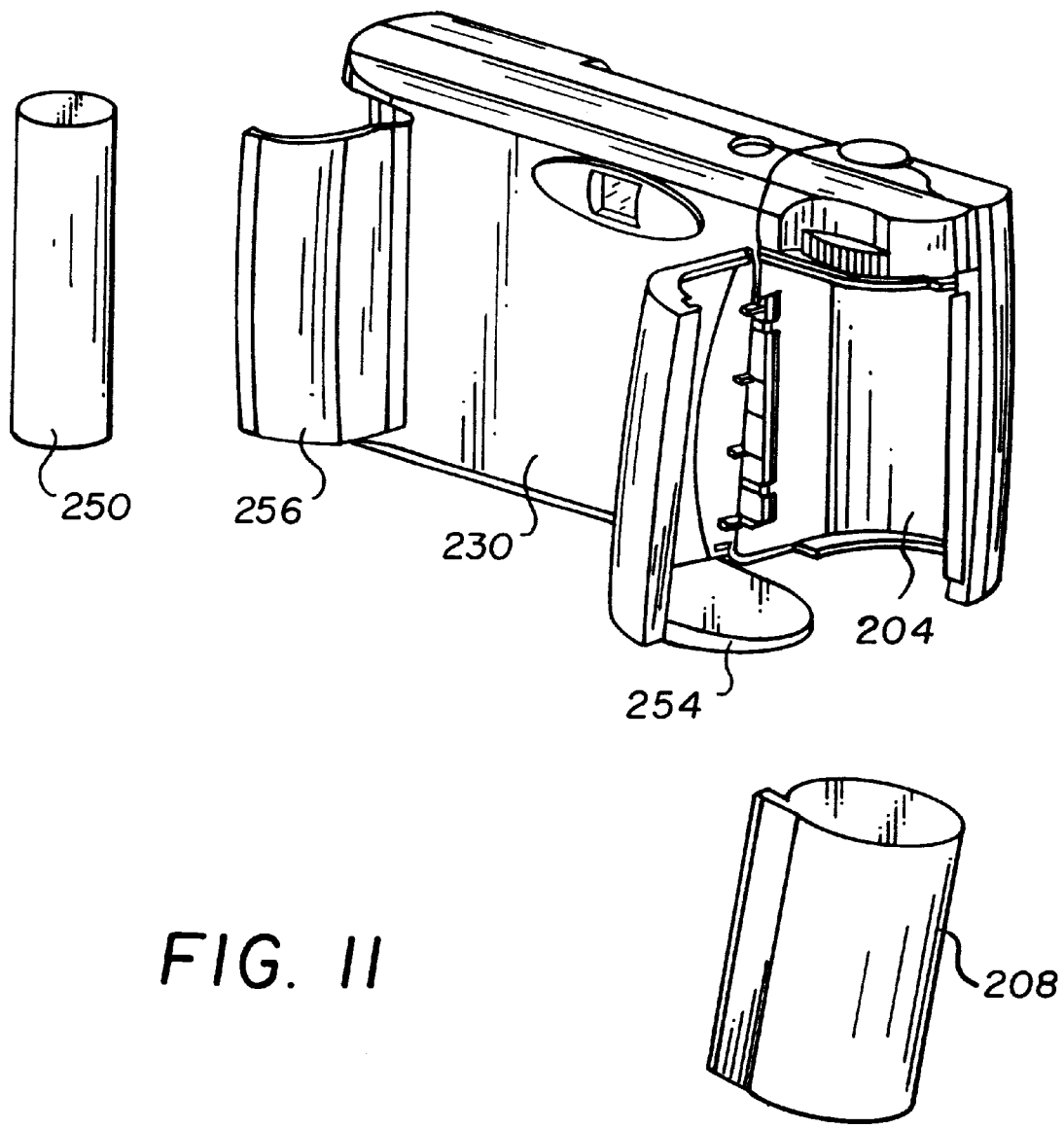
FIG. 11 is a partially exploded rear perspective view of the camera shown in FIGS. 9 and 10A and B.

An efficient recycling program requires a number of competing concerns to be reconciled. In general, the manufacturer/recycler wants to facilitate easy access to the exposed film when removed by the photofinisher. This ensures that the reusable components are not damaged. On the other hand, access to the interior of the camera by the consumer/photographer is undesirable because it increases the risk of damage to and/or contamination of the interior of the camera and its reusable components. These considerations are resolved by the particular design of the door 254 provided on the rear cover as shown in FIG. 11, to access the film chamber 204. To facilitate recycling without damage to the camera, the door 254 may be attached to the camera body 202. The opening of the door 254 provides access to the film cassette 208 without damaging or exposing the camera parts attached to the camera body 202. A second door 256 can also be provided on the rear cover on the front cover to be flexibly opened or broken away by the photofinisher to remove the flash battery 250, if desired. See FIG. 11.

Figure 12:
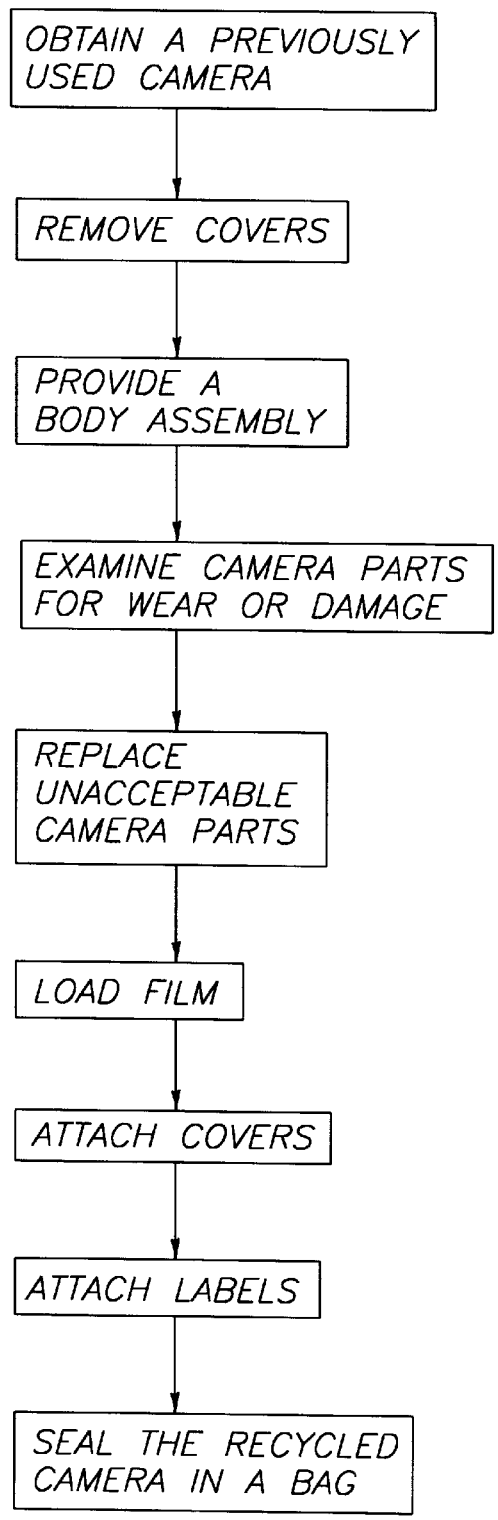
FIG. 12 illustrates a method of making a single use camera from previously used camera parts.

The camera 200 is then turned over to the manufacturer for recycling as will now be described with reference to FIG. 12. The recycling process may comprise the following steps: The front cover 220 and rear cover 230 may be detached from the camera body 202. It should be readily apparent that the covers 220, 230 and body 202 may utilize a number of means for attaching the structural parts together. For example, hook and/or press fitting members may be used, or the parts can be ultrasonically welded together. Thus, each cover may have a suitable number of conventional releasable hook structures, one of which is shown at 262, (FIG. 9) or other attachment means for allowing removal of the covers from the body. The covers may be made from a recyclable plastic such as polystyrene and can be sent to be pulverized. The pulverized material may be blended with virgin materials and new covers or other parts molded therefrom.

The taking lens 212 is also removed. The taking lens may be similarly pulverized with other lenses, blended with virgin materials, and new lenses made therefrom.

Other parts, typically more costly components designed to be reused, such as the main body 202 and the major parts supported by the body, i.e., the viewfinder 218, shutter mechanism 219, film advancing and metering mechanism, and a camera flash unit 100, including the condenser lens element 130, etc. may be examined carefully for wear or damage.

Those parts deemed damaged or worn may be removed from the body 202 and replaced with new parts. Those remaining reusable parts, such as the camera flash unit 100, shutter mechanism 219, etc., that can be reused, remain supported by the camera body, for construction into a camera.

A new front cover 220 is then fitted to the front face of the body 202 and an unexposed roll of film 209 contained within a fresh film cassette 208 is loaded into the film cartridge chamber 204. A new rear cover 230 is then attached to the camera body.

The film 109 is then prewound so that the film is wound back into the cassette 108 as the film is being exposed.

At least one wind and trip check (film advance and shutter actuation) may be done to simulate taking a picture, thereby bringing the counter down to 24 (assuming a 24 exposure roll). The camera then may be inserted into a cardboard casing or a label such as 252 may be attached thereto by adhesive. The recycled camera 200 then may be sealed in a foil wrap, plastic bag or the like, for protection against environmental extremes such as excessive humidity, and packaged in an outer cardboard box for sale. The recycled single use camera, utilizing previously used single use camera parts, such as a camera flash unit 100 is now fully assembled and ready for consumer use.

The foregoing description of the invention is merely exemplary and minor changes and modifications to the invention as described are possible and wholly within the scope of the invention as set forth in the appended claims.

PARTS LIST

| | |
|---|---|
| 25 | target surface |
| 100 | Camera flash unit |
| 102 | a reflector |
| 110 | curving walls 110, of the reflector |
| 110A | reflective inner surface walls |
| 111 | wings |
| 114 | first segment |
| 116 | second segment |
| 112 | tabs 112 |
| 120 | flash lamp tube |
| 121 | direct rays |
| 122 | reflected rays |
| 123> | |
| 124> | >Light rays propagating trough the condenser lens element |
| 125> | |
| 130 | condenser lens element |
| | surface 1 (front side) |
| | surface 2 (back side) |
| | rear vertex Vr; Transition zone T |
| 131 | Fresnel facets |
| 132 | ridges |
| 140 | side walls |
| 140A | reflective inner surface of the side walls 140 |
| 150 | support wall |
| 151 | trigger wire |
| 200 | single-use camera |
| 202 | body |
| 204 | film cassette chamber |
| 206 | take-up chamber |
| 207 | exposure gate |
| 208 | film cassette |
| 209 | film |
| 211 | reuse indicator |
| 212 | taking lens |
| 214 | retainer |
| 215 | aperture |
| 216 | lens plate |
| 218 | viewfinder |
| 219 | shutter mechanism |
| 220 | front cover |
| 222 | keeper plate |
| 223 | spring |
| 223A | depressible bottom |
| 224 | shutter blade |
| 226 | high energy lever |
| 227 | helical spring |
| 228 | thumbwheel |
| 229 | film advance & metering mechanism |
| 230 | rear cover |
| 232 | sprocket |
| 234 | rotatable cam |
| 236 | metering lever |
| 238 | spring |
| 240 | frame counter |
| 242 | baffle |
| 246 | capacitor |
| 248 | circuit board |
| 250 | battery |
| 252 | label |
| 254 | first door |
| 256 | second door |
| 262 | releasable hook structure |

What is claimed is:

1. A camera flash unit for illumination of an associated target surface comprising:
   (i) a linearly symmetric flash light source, said light source providing light defined as light rays;
   (ii) a reflector directing some of the light rays from said flash light source towards the associated target surface, said reflector being adjacent to one side of said flash light source;
   (iii) a refractive/TIR condenser lens element located adjacent to another side of a said flash light source, said condenser lens element having unequal optical power in two orthogonal directions, said condenser lens element having two surfaces—a back surface facing said flash light source and a front surface, one of said two surfaces being a hybrid refractive/TIR surface, the other of said two surfaces being a refractive surface with optical power.

2. A camera flash unit for illumination of an associated target surface comprising:
   (i) a linearly symmetric flash light source, said light source providing light defined as light rays;
   (ii) a reflector directing some of the light rays from said flash light source towards the associated target surface, said reflector being adjacent to one side of said flash light source;
   (iii) a refractive/TIR condenser lens element located adjacent to another side of a said flash light source, said condenser lens element having optical power in two orthogonal directions, said condenser lens element having two surfaces—a back surface facing said flash light source and a front surface, one of said two surfaces being a hybrid refractive/TIR surface, the other of said two surfaces being a refractive surface with optical power, wherein said hybrid refractive/TIR surface has optical power in only one of said two orthogonal directions and said other of said two surfaces has optical power in the other of said two orthogonal directions.

3. A camera flash unit according to claim 2 wherein said hybrid refractive/TIR surface has optical power in direction of said axis of said cylindrical flash lamp tube.

4. A camera flash unit according to claim 3, wherein said flash light source is a cylindrical flash lamp tube having an axis; and said hybrid refractive/TIR surface
   (i) has optical power in one direction, and
   (ii) is said back surface of said refractive/TIR condenser lens element facing said flash lamp tube.

5. A camera flash unit according to claim 4, wherein said front surface has a toroidal shape.

6. A camera flash unit according to claim 4, wherein said front surface is a cylindrical surface having curvature in a direction orthogonal to that of said back surface.

7. A camera flash unit according to claim 4 wherein said front surface is a Fresnel surface.

8. A camera flash unit according to claim 3, wherein said reflector includes (i) a cylindrical first segment having a shape which closely tracks the shape of said flash lamp tube, and (ii) a second segment, said second segment being adjacent to said first segment and having a plano shape.

9. A camera flash unit according to claim 2 wherein said front surface of said refractive/TIR condenser lens element has a first radius of curvature and a second radius of curvature that are in two orthogonal planes.

10. A camera flash unit according to claim 9 wherein said first and second radii of curvature are not equal to one another.

11. A camera flash unit according to claim 2 wherein said reflector has a cylindrical channel having a concave surface oriented towards said flash light source, said concave surface being defined by a radius of curvature.

12. A camera flash unit according to claim 11 wherein the radius of curvature of said cylindrical channel is substantially the same as the radius of curvature of said flash light source.

13. A camera flash unit according to claim 2 further comprising a trigger wire, said trigger wire being in contact with said reflector, and said reflector being in contact with said light source.

14. A camera flash unit according to claim 2 further having reflective side walls channeling oblique rays towards the associated target surface.

15. A camera flash unit according to claim 2, wherein said other, refractive surface is a Fresnel surface.

16. An electronic flash camera comprising:
    a camera body having first and second film chambers;
    a taking lens;
    a flash board supported by said camera body,
    a flash unit having a reflector, a flash lamp tube and a condenser lens element mounted in said flash board, said condenser lens element having (i) unequal optical power in two orthogonal directions; and (ii) two surfaces, one of said surfaces being a TIR surface, the other of the two surfaces being a refractive surface with optical power; and
    an unexposed roll of film disposed in one of said film chambers.

17. A single use electronic flash camera comprising:
    a camera body having first and second film chambers;
    a taking lens;
    a flash board supported by said camera body;
    a flash unit having a reflector, a flash lamp tube and a condenser lens element mounted in said flash board, said condenser lens element having (i) unequal optical power in two orthogonal directions, and (ii) two surfaces, one of said surfaces having a TIR surface shape, the other of the two surfaces being a refractive surface with an optical power; and
    an unexposed roll of film disposed in one of said film chambers.

18. The single use flash camera of claim 17, wherein said flash board has a reuse indicator.

19. The single use flash camera of claim 18, wherein the camera body further comprises a film spool supported for rotation within the body, and the film is prewound on said film spool.

20. The single use flash camera of claim 18, wherein said camera body further supports at least one previously used single use camera part selected from the group consisting of a viewfinder, a taking lens, a shutter mechanism, and a film advance and metering mechanism.

21. A method of making a single use camera with an electronic flash unit from previously used single use camera parts comprising the steps of:
    obtaining a previously used camera body assembly including
    (i) a camera body having two film chambers and a taking lens;
    (ii) a flash unit having a reflector, a flash lamp tube and a condenser lens element mounted in said flash board, said condenser lens element having (i) unequal optical power in two orthogonal directions, and (ii) two surfaces, one of said surfaces having a TIR surface shape, the other of the two surfaces being a refractive surface with an optical power; and
    loading an unexposed roll of film into the film cassette chamber of the camera body.

22. The method of claim 21, further comprising the step of:

determining which, if any, of the previously used camera components must be replaced with new parts.

23. The method of claim 22, further comprising the steps of:

supporting the camera body within a previously used front cover and rear cover; and attaching a paper-based material around the covers.

24. The method of claim 22, further comprising the steps of:

(i) removing the taking lens from the previously used camera body and replacing it;

(ii) replacing, if necessary, previously used parts selected from the group consisting of the camera body, shutter mechanism, and film advance and metering mechanism with corresponding new parts; and (iii) attaching, as necessary, a new front cover and a new rear cover to the camera body.

25. The method of claim 22, further composing the steps of: attaching a paper-based material around the front and rear covers; and sealing the recycled camera in a bag to preserve the unexposed roll of film loaded therein.

* * * * *